United States Patent [19]

Becker, Jr.

[11] 3,803,611
[45] Apr. 9, 1974

[54] DEVELOPMENT OF A DIGITAL DUAL MODE VOR INDICATOR FOR LIGHT AIRCRAFT

[76] Inventor: James R. Becker, Jr., 2984 Essex Rd., Cleveland Heights, Ohio 44118

[22] Filed: June 1, 1971

[21] Appl. No.: 148,851

[52] U.S. Cl. .................. 343/106 R, 340/27 NA
[51] Int. Cl. .............................................. G01s 1/46
[58] Field of Search ............. 343/106 R; 340/27 NA

[56] References Cited
UNITED STATES PATENTS

| | | | |
|---|---|---|---|
| 3,525,979 | 8/1970 | Kunkel et al. | 340/27 NA |
| 3,696,385 | 10/1972 | Burns | 340/27 NA |
| 3,653,047 | 3/1972 | Anthony | 343/106 R |
| 3,495,248 | 2/1970 | Raether et al. | 343/106 R |

Primary Examiner—Maynard R. Wilbur
Assistant Examiner—Richard E. Berger
Attorney, Agent, or Firm—McNenny, Farrington, Pearne & Gordon

[57] ABSTRACT

The digital dual mode VOR indicator is a digital aircraft navigational instrument intended to replace the current dial or needle type VOR indicators. The new indicator has two modes of operation. In the first mode the instrument functions like a conventional omni while during the second mode of operation the VOR indicator constantly reads out the plane's bearing from the VOR station. The bearing information is displayed in a large three numeral, lighted, digital display. The invention covers the electronic circuitry to provide the digital readout.

15 Claims, 15 Drawing Figures

$Q_n$ = STATE OF Q AFTER $t_n$

*Q WILL NOT CHANGE WHEN INPUTS GO FROM $S_D = \overline{C_D}$ TO $S_D = C_D = 0$

Q CANNOT BE DETERMINED WHEN INPUTS GO FROM $S_D = C_D = 1$ TO $S_D = C_D = 0$

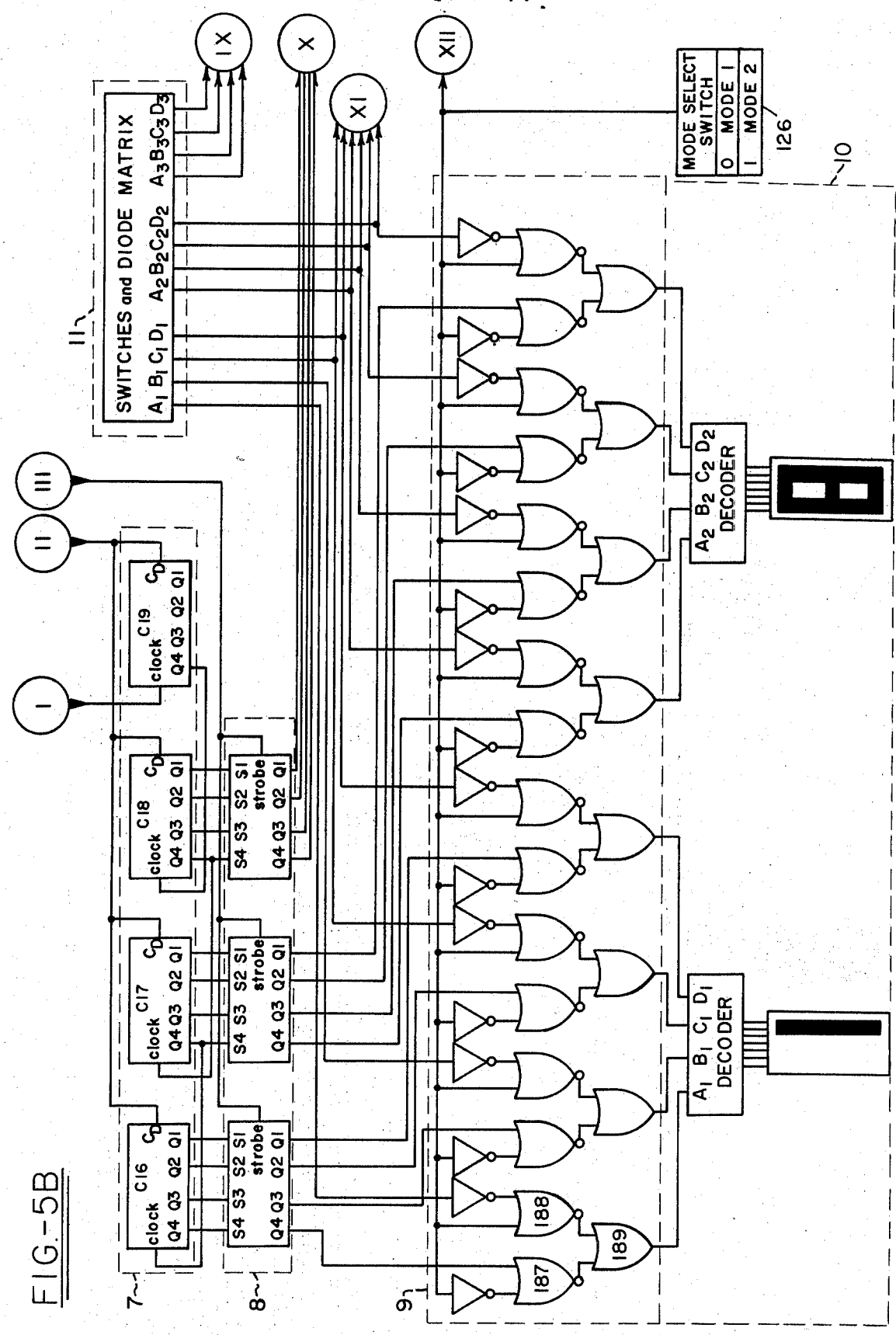

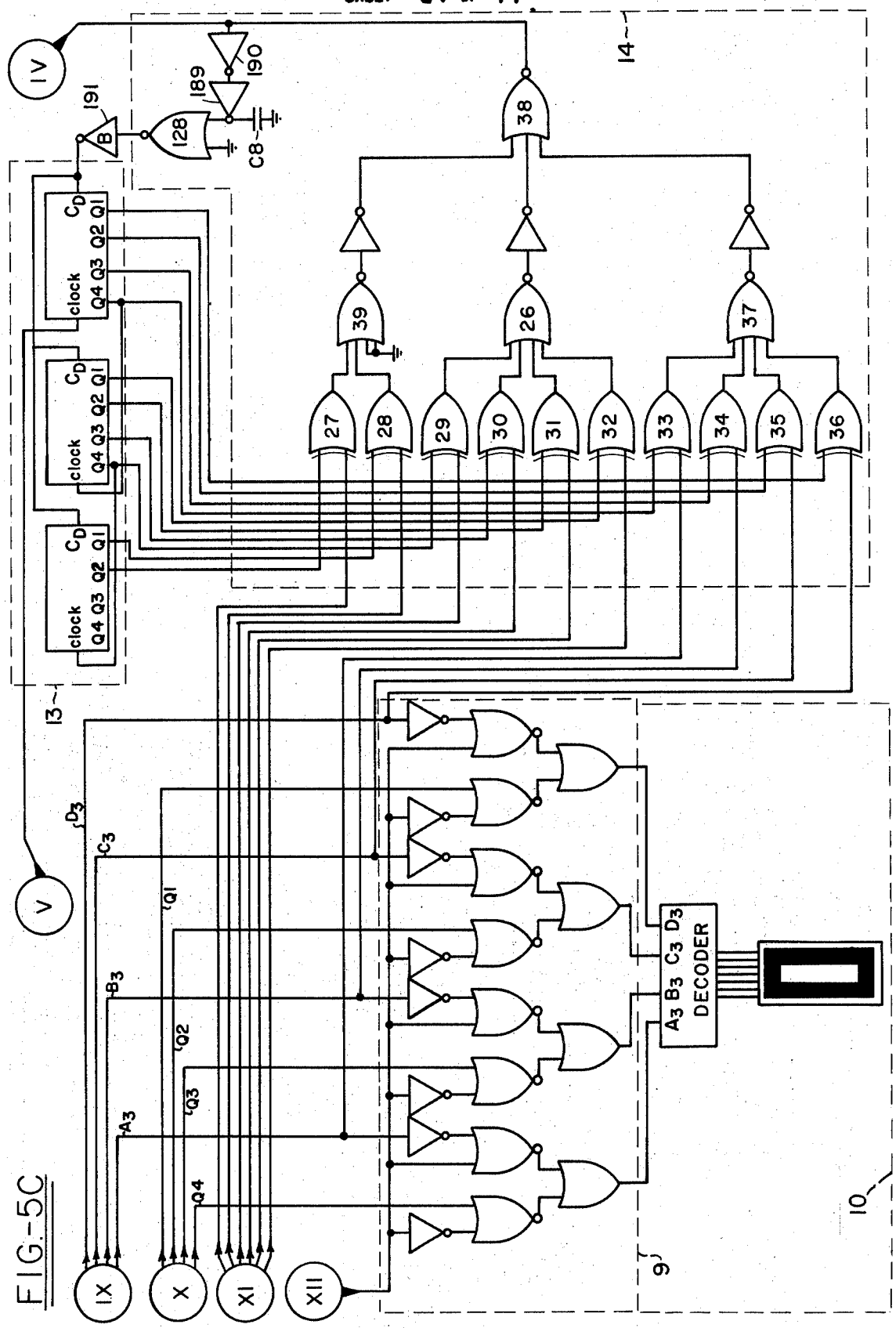

FIG-8

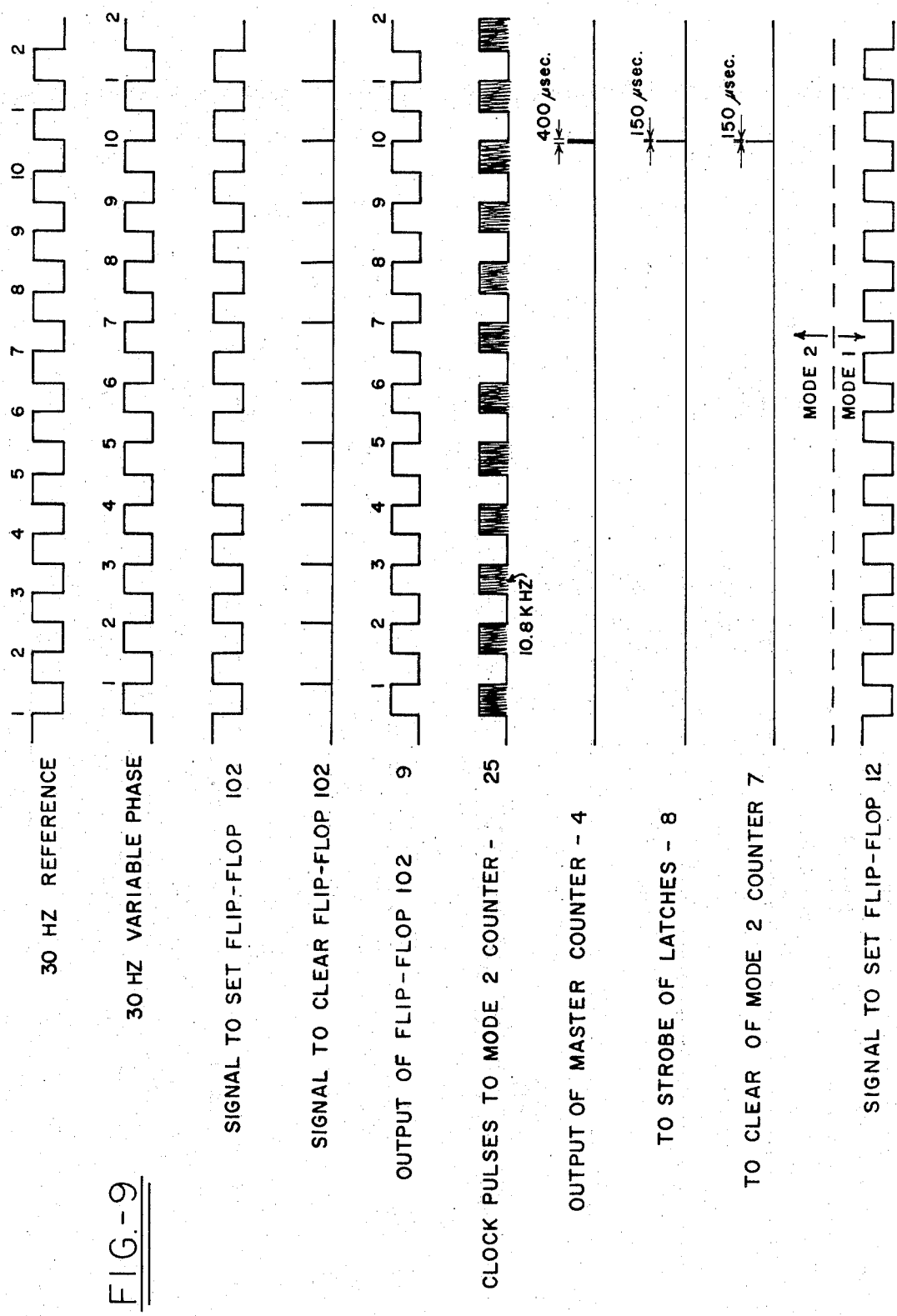

DEVELOPMENT OF A DIGITAL DUAL MODE VOR INDICATOR FOR LIGHT AIRCRAFT

The Very High Frequency Omni directional range is the mainstay of aviation navigation in the United. States. With almost 1000 VOR stations across the United States and over 1,000,000 airborne units sold, the system represents a considerable investment that will continue in use, with modifications, for several decades.

The VOR or omni system is a radio navigational aid operating on the 108 MHz to 118 MHz band with channels spaced 50 KHz apart. Essentially the information that the omni presents to the pilot is his magnetic compass bearing from one of the specialized VOR or VOR-TAC radio stations. Pilots refer to the "radial" the plane is on or its bearing from the station, i.e., a bearing from the omni station of 240° means the plane is on the 240° radial. All bearings are measured from magnetic north. The omni works by comparing the phase of two 30 Hz signals whose phase difference is directly proportional to the bearing of the aircraft from the omni station. The station transmits essentially two signals on its MHz carrier. One is a 9960 Hz FM signal modulated ±480 Hz at a rate of 30 Hz. This is the reference signal whose phase is constant all the way around the station. The other signal is a 30 Hz AM signal whose phase varies as you go around the station (with respect) to the 30 Hz signal contained in the FM. The two signals are oriented so that they are in phase when you are north (magnetic) of the station, 90° out of phase when you are east of the station, 180° out of phase when you are south of the station, etc. The output of the station generally contains not only the omni bearing signals but a voice identifier and a Morse Code identifier consisting of a keyed 1020 Hz tone. The transmitter is crystal controlled with an output power of 200 watts.

CURRENT VOR INDICATORS

The airborne equipment consists of two parts: a receiver, generally crystal tuned between 108 and 118 MHz which receives and detects the MHz signal and whose output is the 9960 Hz FM plus the 30 Hz AM plus any voice or Morse Code identifier. The second part of the airborne equipment is the omni unit itself which takes the information in the 9960 Hz FM and the 30 Hz AM signals and converts it into a display of the aircraft's bearing.

Almost all omni units are basically the same. The 9960 FM and the 30 Hz AM are separated by filtering. The FM signal is then limited and detected to give a 30 Hz AM signal out. The bearing information is then contained in the phase difference between these two 30 Hz signals. One of the 30 Hz signals is fed into a phase shifter (either a resolver or a precision R-C circuit) which is connected to the OBS (omni bearing selector) knob and to the compass card in the omni that gives you your desired bearing. The phase difference between the two 30 Hz signals is measured by a phase detector which drives the omni left-right needle. When the OBS knob is turned it shifts the phase of one of the 30 Hz signals and rotates the compass card. The left-right needle will center when the two signals are in phase. So what one measures with the omni is how much you have to shift the phase of one signal to put the two signals in phase. This measurement is indicated on the compass card. For example, if you are due north of the station the two 30 Hz signals are in phase as they come from the station so no phase shift of the two signals is needed in the omni itself. The needle is centered when the compass card reads 0°. If you are due east of the station the two signals are 90° out of phase as they are transmitted from the station, and you must apply a 90° phase shift in the omni unit itself to bring them back into phase. So the phase shifter is rotated 90° which also rotates the compass card 90°. The phase difference between the two signals in the omni is then zero so the needle is centered and the compass card reads 90° which is your bearing from the station. If you were to leave the compass card (and thus the phase shifter) set at 90° and take up a bearing of 80° from the station, the two signals in the omni no longer would be in phase so the needle would swing to the right (assuming you were flying FROM the station) indicating you are off the 90° radial. This how you get the left-right indication used to fly a particular omni bearing (the Victor Airway, etc.). Your bearing also depends upon whether it is to the station or from the station and this information is provided by another phase detector which operates 90° out of phase with the first phase detector to give you the TO-FROM indication.

Almost all omnis contain at least the following circuits: a 30–9960 Hz filter, a limiter, an FM detector, 30 Hz amplifiers, a phase shifting circuit, two phase detectors and two meters, which drive the needle and flags. Most omnis also contain circuits to allow it to operate in localizer mode. What varies from model to model is the complexity and sophistication of various circuits, the quality of the components, what extra circuits are added to make the unit work better (such as propeller modulation filters), how much the device has been miniaturized etc. These differences help determine how accurately the omni will measure the phase difference in the two 30 Hz signals and thus how accurately the unit can indicate your position. Tests of units in operation indicate that airline and military grade VOR units are accurate within ± 2.5 percent and general aviation grade VOR units provide indications within ± 4.5 percent (95 percent of the time). This information is contained in FAA report, "VOR System Accuracy", June, 1965.

PROBLEMS WITH THE CONVENTIONAL OMNI INDICATOR

There are several faults with the conventional omni. First, the compass card type bearing readout is hard to read and is frequently misread. It is difficult for the pilot to see the numbers at a quick glance; he has to stare for just a second to obtain his data. Secondly, if the pilot is trying to locate his position he must constantly keep turning the OBS knob to keep the needle centered, to obtain the bearing of the aircraft. Turning the OBS knob is distracting, takes time, and is not always the easiest thing to do accurately when the plane is bouncing around in rough air.

Other problems with the conventional omni indicator are the meters which drive the TO-FROM flag and L-R needle. These are microamp meters, expensive, and a small piece of dust can cause them to hang up. The amount the L-R needle deflects is a function not only of the number of degrees off course the plane is but also how far the plane is from the station, e.e., at 100 miles, 10° off course may hardly move the needle but at 30 miles 10° would put the L-R needle off scale.

THE CONCEPT OF THE DIGITAL DUAL MODE OMNI

The general object of my invention is to provide an omni that performs like a normal one, but at the flip of a switch also constantly and automatically reads out the aircraft's bearing from the station. In other words, if the pilot were to fly circles clockwise around an omni station, the bearing indicator would constantly change from 0° to 359° without his having to touch a thing. This is of tremendous use to the pilot if he is trying to locate his position. All he has to do is tune his radio to the correct station and his bearing from the station appears automatically. This second mode also eases the workload on the pilot in finding cross bearings.

A further object of the invention is to convert the bearing readout of the conventional omni into a digital display.

A further object of the invention is to change the L-R indicator from a needle to a horizontal row of lights, consisting of 11 small lights, a green light in the center indicating on corse when lit, 5 blue lights to the left and 5 yellow lights to the right to give the pilot a fly left or fly right indication. Each light lit indicates 2° off course so if the aircraft is 4° off course 2 lights would be turned on up to all 5 lights for 10° or greater off course.

A further object of the invention is its dual mode operation. During the first mode of omni operation, the normal omni mode, the new omni functions just like a conventional omni. The pilot sets in his desired bearing through the OBS knob (now connected to switches) and that bearing appears as a 3 digit number from 0° to 359°. The light bar displays his fly left or right or on course information. In the second mode of operation the omni continuously and automatically reads out the aircraft's bearing to the omni station and the light bar is turned off. The pilot is able to select either of these modes with the flip of a switch providing him with ease and flexibility in the VOR navigational system.

For a better understanding of the invention reference should be made to the accompanying drawings wherein.

Figure 5A:
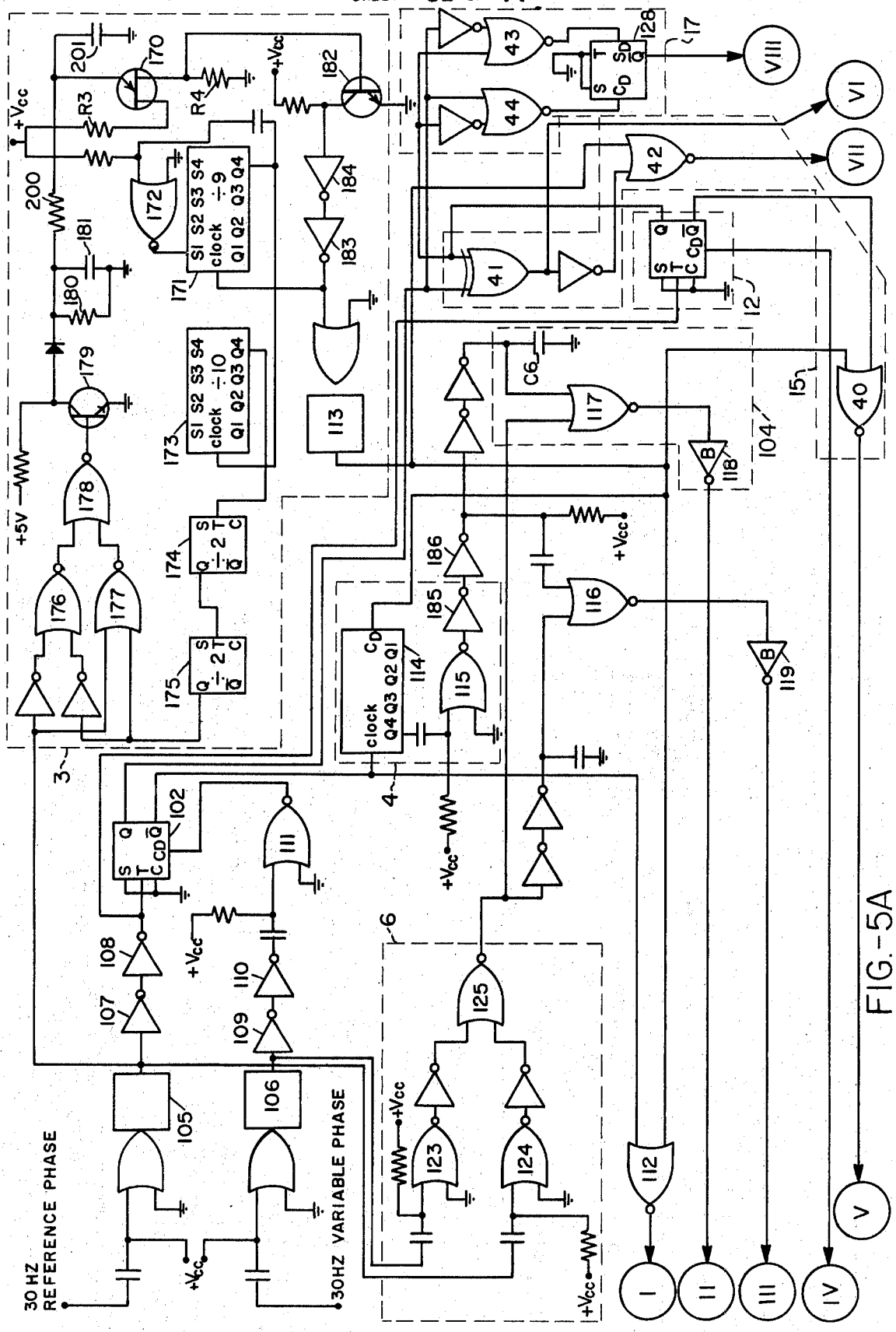
Figure 5D:
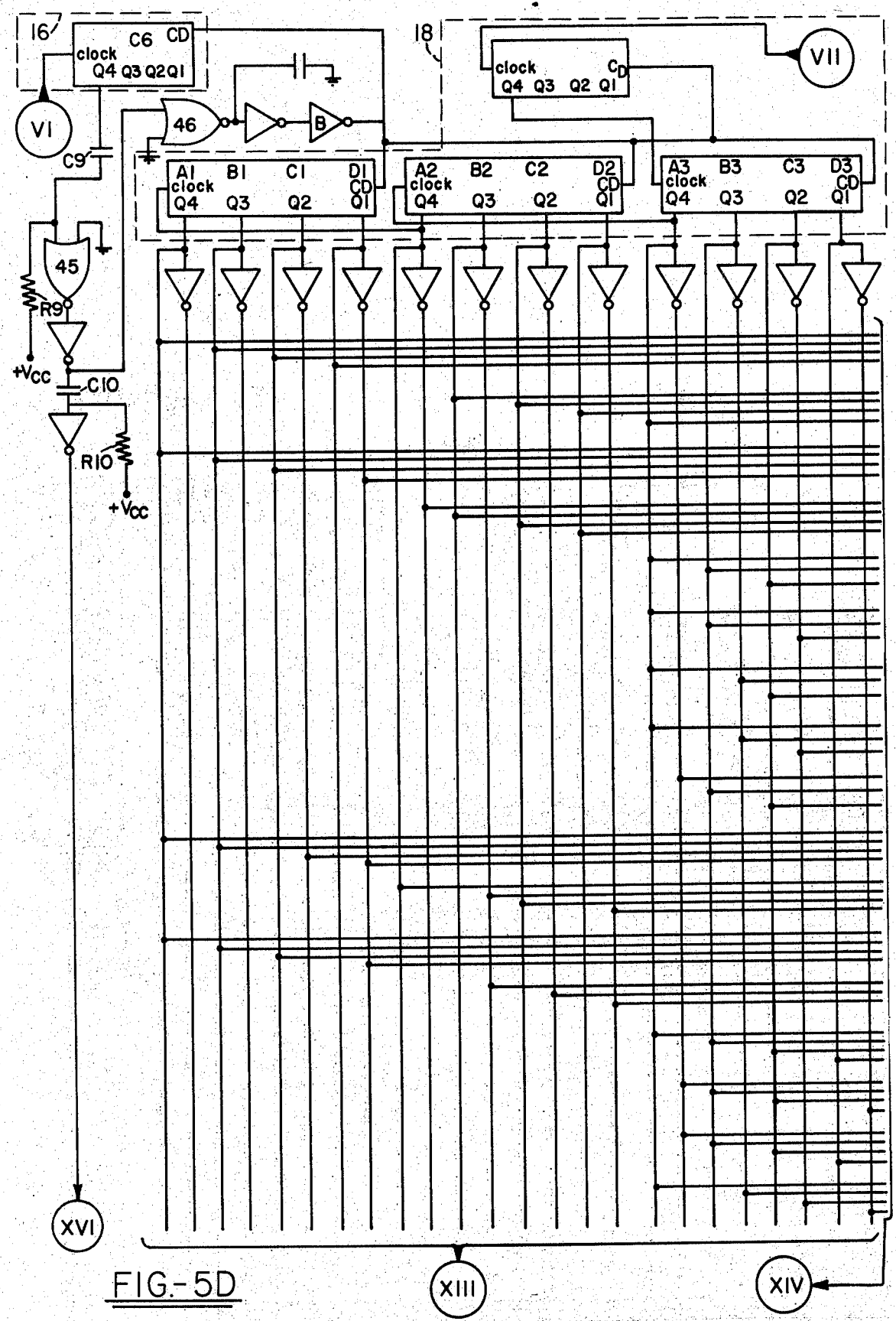
Figure 5E:
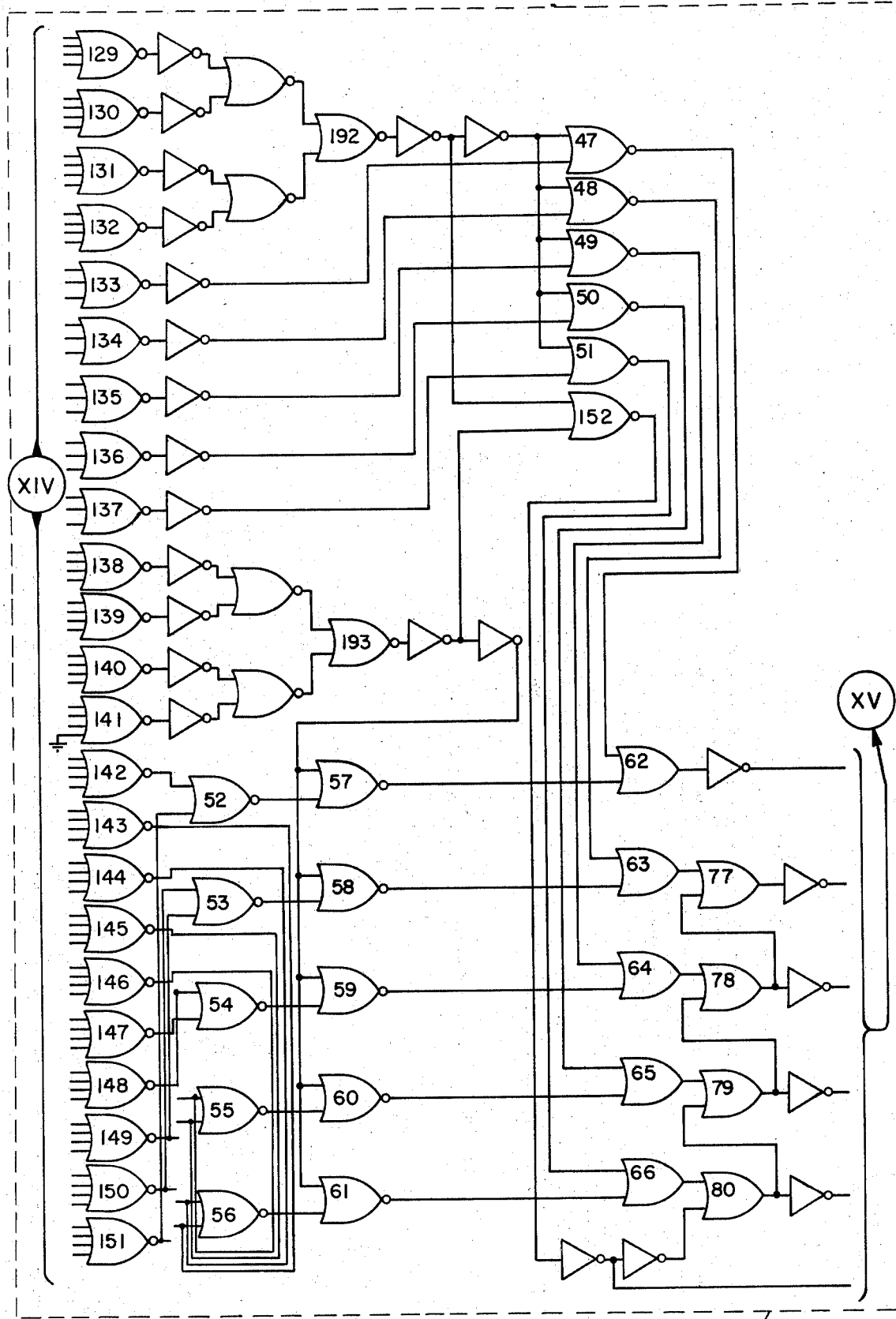
Figure 5F:
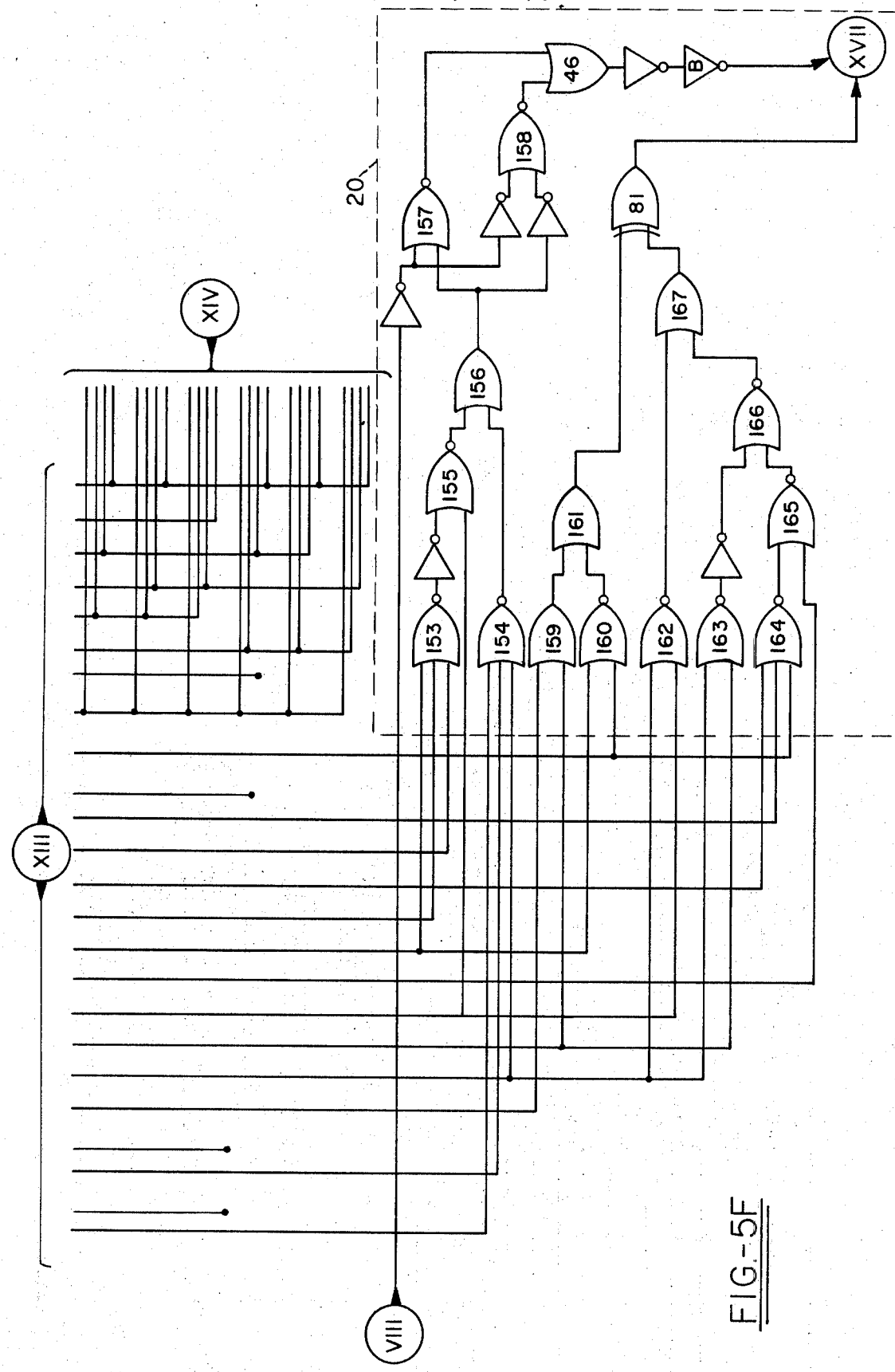
Figure 5G:
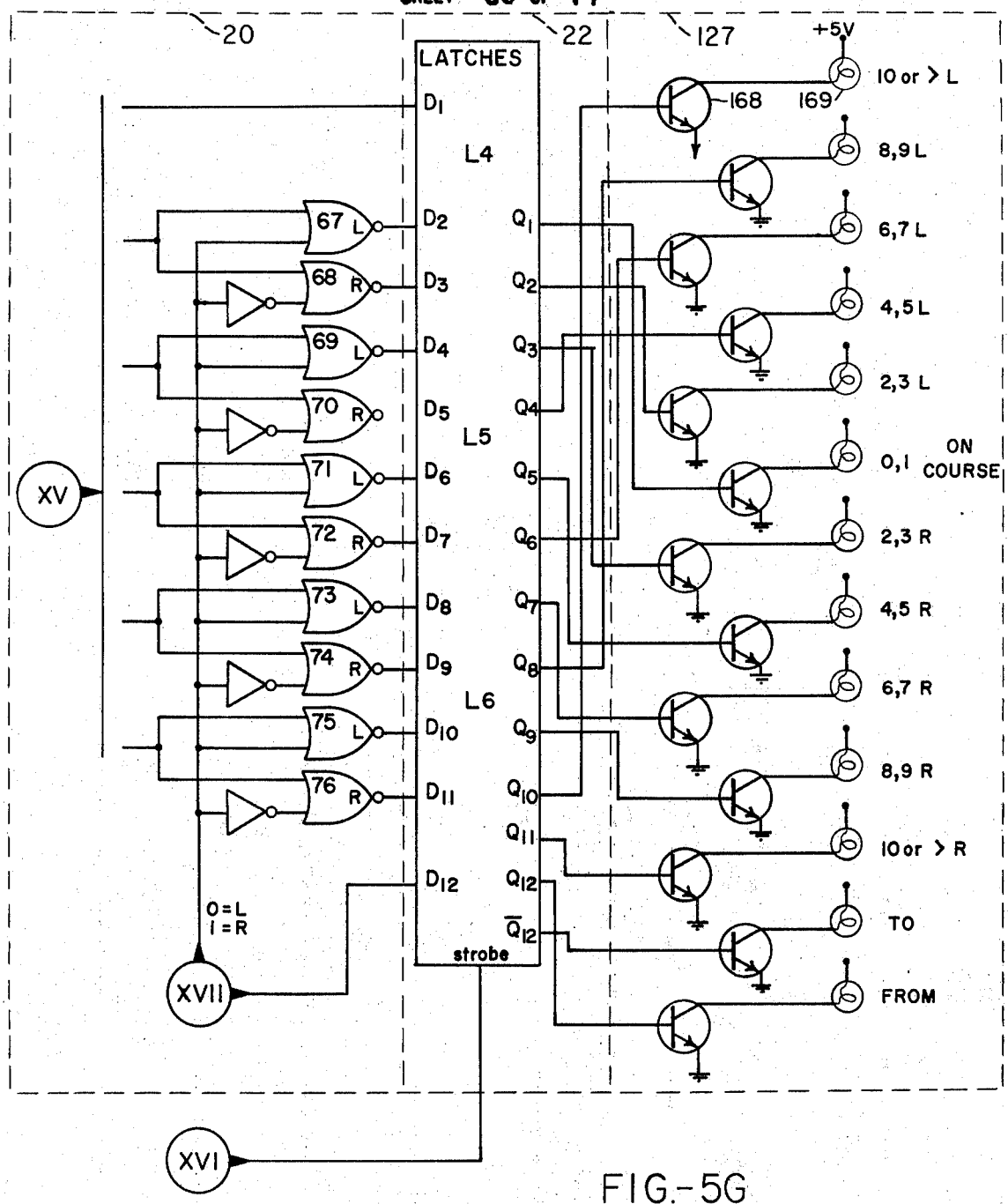
Figure 6:
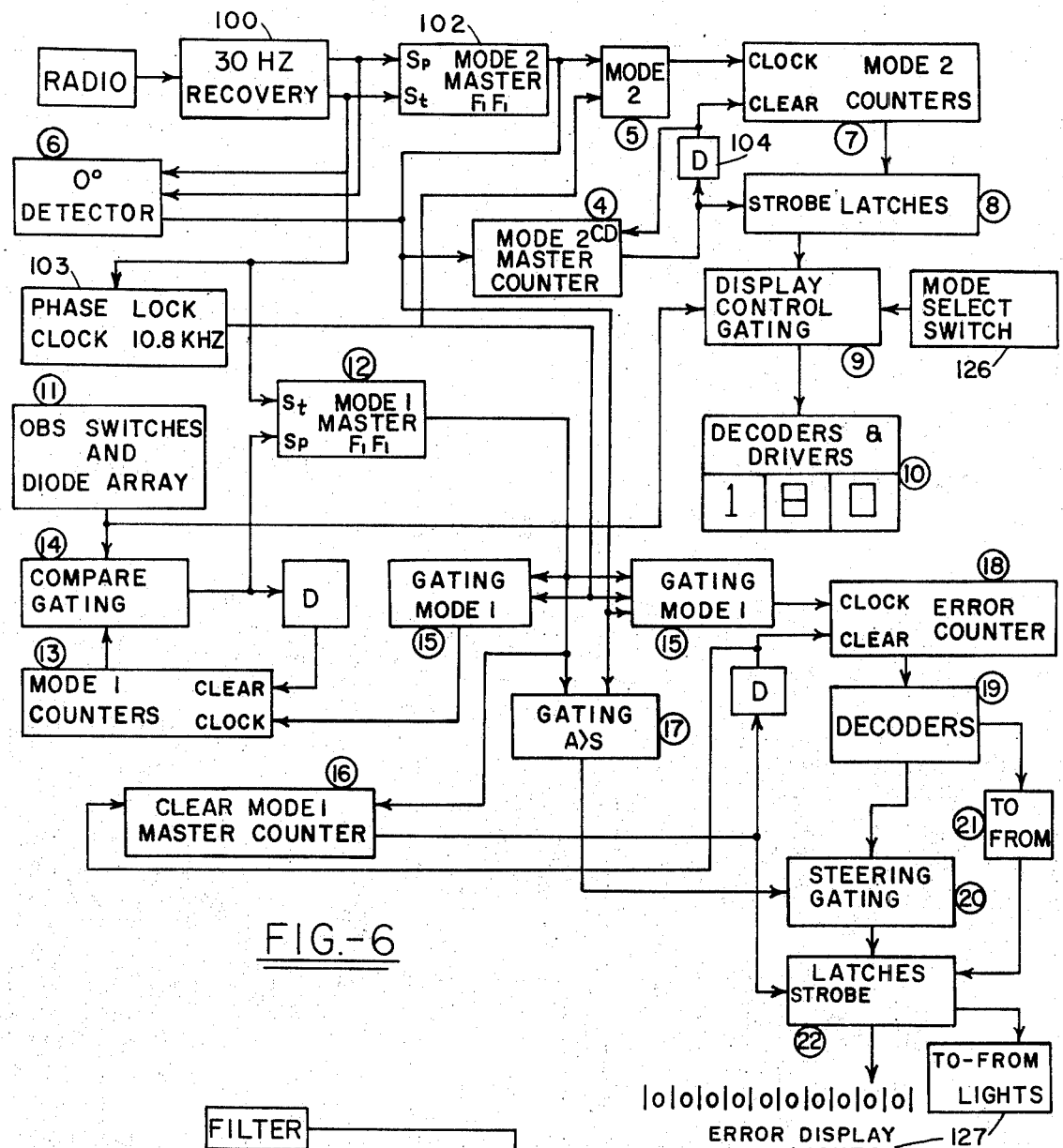
Figure 7:
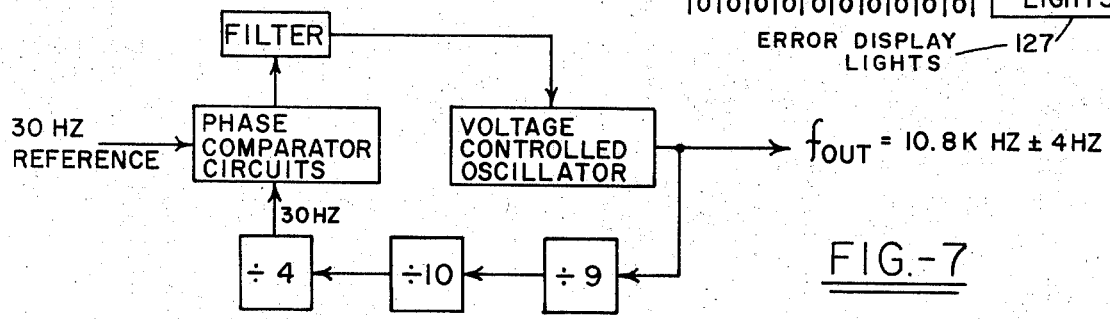

FIGS. 5A through 5G provide a schematic diagram of the total circuit of the invention;

FIG. 6 is a block diagram of the circuit of FIG. 5;

FIG. 7 is a block diagram of the phase lock clock utilized in the overall circuit to perform the timing requirements;

Figure 8:
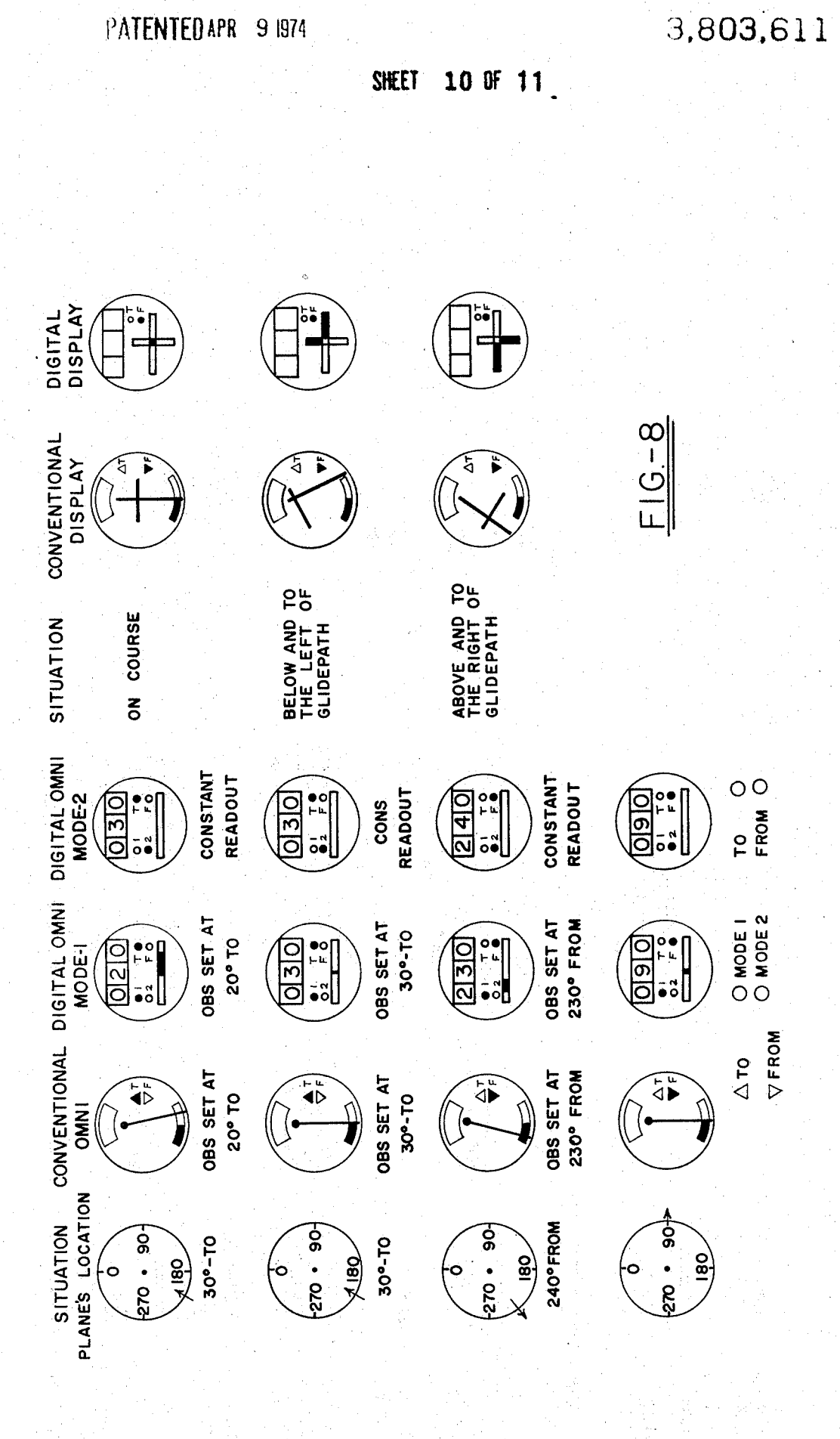

FIG. 8 illustrates the dials for conventional omni, my digital omni and the relationship to the localizer and glideslope; and FIG. 9 is a graph of the timing diagram and its relation by waveforms to the various points noted in the circuit diagram of FIG. 5.

DESIGN CONSIDERATION OF THE DIGITAL DUAL MODE OMNI

In the circuit construction I used two special techniques, one to detect the falling or rising edge of wave forms and the other to achieve delays.

Figure 1:
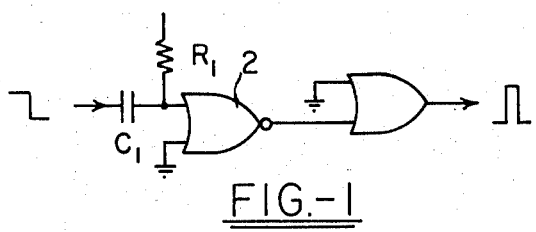
FIG. 1 is a schematic diagram of a pulse generating circuit used in the overall system.
Figure 3:
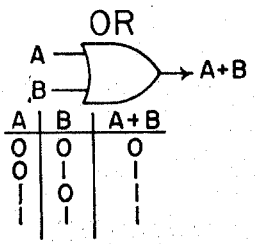
FIG. 3 is a graphic illustration of a plurality of logic elements utilized in the overall system and showing the typical logic associated with each element.
Figure 3:
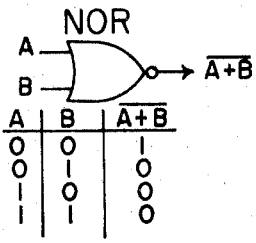
Figure 3:
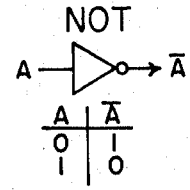
Figure 3:
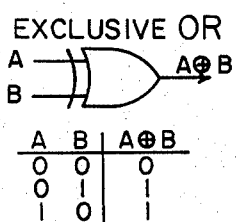
Figure 3:
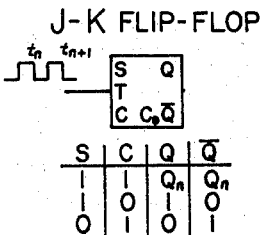
Figure 3:
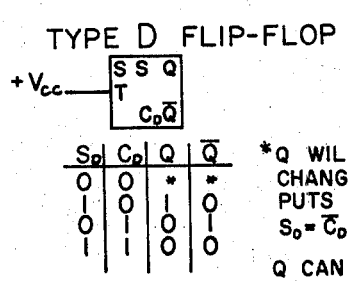

Reference should be made to FIG. 1 which shows to detect the falling edge of a waveform, I simply capacitively coupled two gates with a pull up resistor after the capacitor. When the output of a gate makes a transistion from 1 to 0 (logical levels, positive logic) it momentarily discharges C1 and creates a logical 0 on the first input of gate 2. Coupled with the grounded other input of gate 2, the output of gate 2 momentarily jumps to a logical 1 as seen by the truth tables of FIG. 3. The pullup resistor R1 soon recharges C1 however, which drives the output of gate 2 back to zero. The duration of the pulse is controlled by the sizes of R1 and C1. It is basically a RC circuit. Gate 2 could just as well be an inverter, or a typical component of this type.

Figure 2:
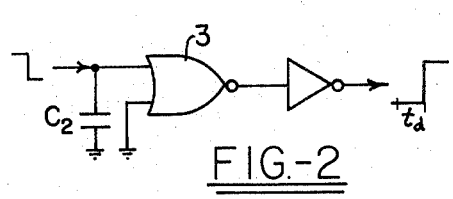
FIG. 2 is a delay circuit which forms an important component in the overall system.

To delay a pulse one simply attaches a capacitor to ground at the point one wants the delay as shown in FIG. 2. This will delay only the 0 to 1 transition of a waveform. What you are doing is charging a capacitor through the resistor in the previous IC and when the voltage across the capacitor becomes high enough the next gate 3 turns on. One must be careful that C2 is not made too large or one can burn out the previous gate during the switching.

MODE 2

I will now describe how mode 2, the constant readout mode, works in terms of the block diagram of FIG. 6. After that I will discuss, in detail, the mode 2 logic and then I will do the same for mode 1.

Figure 4:
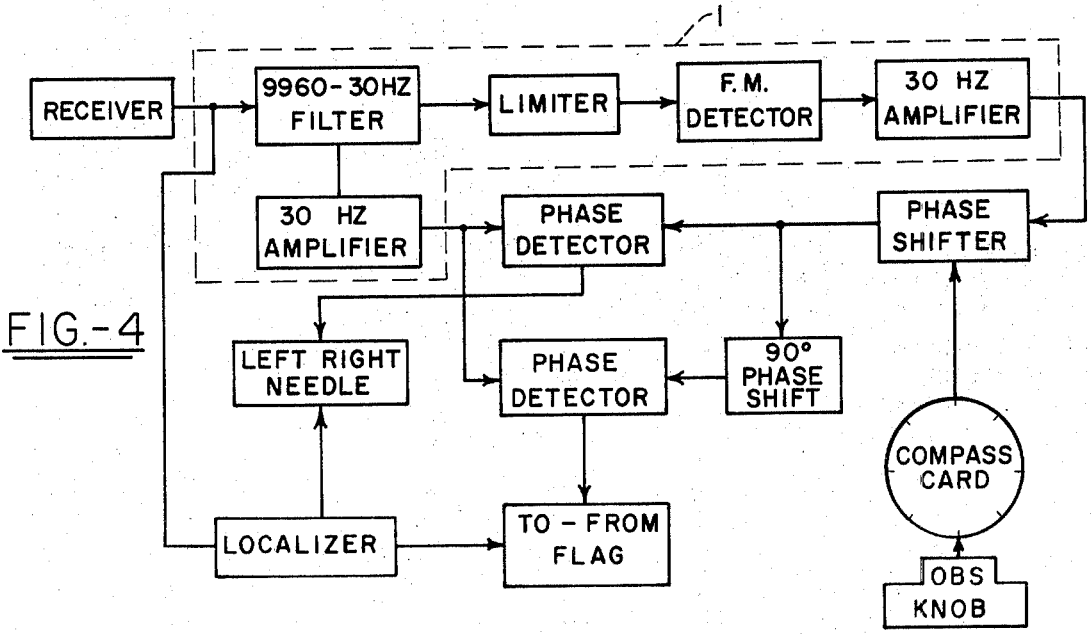
FIG. 4 is a block diagram illustrating the generation of the input VOR signal from the receiver to provide the digital information for use in the circuit of the invention.

As I stated above, the bearing of the plane from the omni station is equal to the phase difference of two 30 Hz signals. The first problem is to separate the 9960 FM and the 30 Hz AM or to recover the 30 Hz signals. To do this I use the analog circuits shown in dotted block 1 of FIG. 4 for the 30 Hz recovery 100 which is part of the most conventional omni circuits. The outputs of these circuits are two very pure 30 Hz sine waves. The signal that was detected from the FM is the reference phase signal while the 30 Hz output that came from the AM input is the variable phase signal. The idea is to find the phase difference between the two. I decided to do this by counting the time between the negative going zero crossings of the 30 Hz sine waves. These zero crossings occur every one-thirtieth of a second so if the 2 signals are 360° out of phase (ignore temporarily that 360°=0°) then the maximum amount of time I will want to count for is one-thirtieth sec. Therefore the rate I should count at if I am going to make the count of time equal to the bearing of the airplane is 10,800 counts/sec (360 × 30= 10,800). To count I utilize a clock 103 that runs at 10,800 Hz ± 4 Hz which I will discuss later. I use the zero crossing of the reference phase 30 Hz signal to turn on the mode 2 master flip flop 102 and the zero crossing of the variable phase 30 Hz signal to turn off the mode 2 master flip flop. Thus the time the mode 2 master flip flop is on is a direct representation of the phase difference of the two signals and hence a representation of the bearing of the airplane. When the master flip flopb 102 is on it enables some gating 5 which allows clock pulses to flow into a series of decade counters 7. Every one-thirtieth of a second the number of pulses coming into the counters is equal to the bearing of the airplane. This could be displayed every one-thirtieth of a second but I have found it better to average over several 30 Hz periods. A simple means of digital averaging is to count over 10 or 100 periods and then drop the last one or two digits. The question was whether to average the bearing over 10–30 Hz cycles and update the bearing display every one-third sec. or to average over 100 cycles and update the display every 3 seconds. The problem was, will the bearing displayed lag behind the real bearing of the airplane too much. The critical parameter for determining the displayed bearing lag is the rate of change of bearing which is a function of the plane's speed, distance from the VOR station and direction of flight relative to the station. A plane going fast (500 mph) close to the omni station (5–10 miles) could suffer 2 lag in the bearing display up to 15° if the display were updated every 3 seconds. Hence, it appears preferable to average over 10 cycles.

To average over 10 cycles I let the mode 2 counters 7 count for 10–30 Hz cycles so at the end of the tenth cycle the number in the counters is 10 times the plane's bearing. The mode 2 master counter 4 counts the number of 30 Hz periods and after the tenth it strobes the latches 8 so that they take on the three most significant digits in the counters 7 (a number equal to the plane's bearing). The number in the latches 8 is then decoded by the BCD to seven segment decoder 10 and displayed as a three digit number, achieving the desired constant readout of the plane's bearing. The delay 104 allows latches 8 to store these digits of the counter 7 before it is cleared.

The implementation of the mode 2 operation is straightforward and is shown in the master logic diagram of FIGS. 5A–5G. The two 30 Hz signals are capacitively coupled into a pair of schmitt triggers 105, 106 to be turned into square waves. This interfacing is a problem and the triggers must be biased to make them work correctly. The reference phase 30 Hz square wave is run through a pair of inverters 107, 108 and used to toggel the mode 2 master flip flop 102. The variable phase 30 Hz square wave after being inverted by gates 109, 110 is fed into a falling edge detector circuit 111 like the one explained in FIG. 1 that generates a short duration pulse (500 nsec) connected to the clear direct of the mode 2 master flip flop 102. The inverted output of the mode 2 master flip flop 102 is used to enable gate 112 that allows clock pulses to flow into the counters C16, C17, C18, and C19. The Schmitt trigger 113 is used to insure that the clock pulses have in fact fast enough falling edges to drive the counters 7. The mode 2 master counter 114 counts 10 cycles out of the mode 2 master flip flop 102 and at the end of the tenth count it generates a pulse (300 micro sec) through gate 115. This pulse is turned into a shorter pulse beginning at the same time (discounting gate delays) of a shorter duration (100 microsec) by gate 116. This output is used to strobe the latches 8. The output of gate 115 is also fed into a delay circuit; C6 and gate 117, that delays the pulse 200 microsec and then generates a pulse 100 microsecs long to clear the counters 7 and the mode 2 master counter 114. The outputs of gates 6 and 7 are buffered by gates 118, 119 due to the large number of loads they have to drive. Gates 123 and 124 detect the falling edges of the 30 Hz signals and when they occur at the same time and gate 125 generates a pulse which is then used to clear the counters 7 and strobe the latches 8.

Hence, it is seen that the general idea of the mode 2 operation is very simple, just count the time between the two 30 Hz signals.

MODE 1

In the mode one or normal mode of operation what one wants to do is compare the bearing the plane is actually on (called the actual bearing) and the bearing the pilot has set into the omni through the OBS switches (called the set bearing) and then tell the pilot how to fly from where he is to where he wants to be. There are several things that must be done to accomplish the above. 1) The control of the three digit display must be switched from the mode 2 latches to the OBS switches. 2) The device must calculate the difference between the actual bearing in the mode two counters and the bearing set into the OBS switches. Not only the magnitude, but the sign of the error must be calculated. 3) The magnitude and sign of the error must then be decoded to give the pilot his fly left or right or on course indication and his TO-FROM indication.

The switching of the three numeral display is shown in the block diagram of FIG. 6. The outputs of both the OBS switching 11 and the mode 2 latches 8 run into the display control gating 9. The mode select switch 126 then selects which set of inputs will control the display.

To find the magnitude of the bearing error I added a second set of counters 13 that counts off the same clock 103 as the mode 2 counters 4 but counts to the numbers set into the OBS switches 11. This is accomplished by the same gating 14 that continually compares the output of the mode 1 counters 13 with the number in the switches 11. When the two are equal the gating 14 shuts the counters 13 off. Both the mode one and mode two counters 13, 7 are turned on at the same time by the reference 30 Hz signal toggeling their respective master flip flops, 12, 102 which in turn allows the clock pulses to flow into the counters. So what one now has are two counters; one that counts for a length of time equal to the plane's actual bearing and one that counts for a length of time equal to the desired or set bearing. The difference between the two counts or the length of time one counter is running while the other is not, is an exact representation of the magnitude of the bearing error. It is a direct representation of the difference between the bearing the plane is actually on and the bearing the pilot wants to be on.

Special gating 15 senses the time that one counter is running and the other is not (actually it watches the outputs of the master flip flops 102, 12)and during this time it turns on a third set of counters, the error counters 18. So each 30 Hz cycle the error counters count a number of clock pulses that is equal to the bearing error of the airplane.

The sign of this bearing error is determined by gating 17 that senses which count is larger, the actual bearing count or the set bearing count. The gates 17 generate a logical one if the actual bearing is greater than the set bearing and a zero otherwise.

Everything is again averaged over 10–30 Hz cycles by the mode 1 master counter 16 which strobes the mode 1 latches 22 and clears the error counters 18. The exceptions to this are the mode 1 counters 13 which are cleared every 30 Hz period.

Once you have a representation of the magnitude and sign of the bearing error it has to be decoded to tell the pilot to fly left or right or that he is on course and to tell him whether his bearing is TO or FROM the station. There are many complications to this decoding. I assumed that the mode 2 counters were always going to calculate the bearing FROM the station (measured clockwise from a north/south line through the station) during mode 1 operations.

| Error Magnitude | Sign | Indication |
| --- | --- | --- |
| $0° < E < 180°$ | A > S | fly right |
|  | A < S | fly left |
| $180° \leq E \leq 360°$ | A > S | fly left |
|  | A < S | fly right |
| $0° \leq E \leq 90°$ | — | TO |
| $90° \leq E \leq 270°$ | — | FROM |
| $270° \leq E \leq 0°$ | — | TO |

The decoded output is run through a set of latches 22 before it drives the lights 127. These latches are strobed every 10–30 Hz periods by the mode 1 master counter 16.

The implementation of the mode 1 in logic circuits becomes fairly involved. The control of the 3 digit display 10 is accomplished by means of 24 – 2 input NOR gates, 12 OR gates and several inverters, 9 in FIGS. 5B, C. Each output from the latches 8 and the OBS switches 11 is connected to one input of a nor gate. The other input of the NOR gates is connected to the inverted output of the mode select switch 126 while the second input of the OBS NOR gate is connected directly to output of the mode select switch 126. Thus when the output of the select switch 126 is high (3.6 volts = logical 1) the latches 8 control the display 10 and when the output is low the OBS switches 11 control the display.

The mode 1 counter 13 is reset every 30 Hz cycle so it is only three decades long. It is turned on through gate 40 of FIG. 5A when mode one master flip flop 12 is toggled. The output of the counter 13 is continuously compared with the number from the OBS switches 11 by gates 26 through 39. Gates 27 through 36 are exclusive OR gates and each one compares corresponding bits of the counter 13 and the OBS switches 11, and when the bits are identical the output goes to zero. When all 10 bits of the counter 13 are identical to the 10 bits of the OBS switches 11, the output of gate 38 goes high and clears the mode 1 master flip flop 12 which disables gate 40 and shuts down the counter. After a short delay through C8 and gate 128 the output of gate 38 clears the counters 13; however, they do not start counting again until the mode 1 master flip flop 12 is again toggled by the 30 Hz signal. The output of the counter 13 is a representation of the bearing set into the omni by the pilot.

The outputs of mode 1 flip flop 12 and mode 2 flip flop 102 are compared in gate 41, an exclusive OR, which enables gate 42 and thus turns on the error counter whenever either the mode 1 or mode 2 counter 13, 7 is turned on but the other one is not. So every one-thirtieth second the output of gate 42 is a number of clock pulses equal to the degree's difference between the actual bearing of the airplane and the set bearing. The mode 1 master counter 16 counts 10–30 Hz periods and then strobes the latches 22, which are at the end of the decoders 19 and then clears the error counters 18.

At the end of 10–30 Hz periods the number in the error counters (C10-C13) 18 of FIG. 5D is equal to 10 times the bearing error. The last digit is dropped and only the three most significant digits are decoded. Counter C11 is the most significant digit now while C13 is the new least significant digit.

The outputs of the mode 2 flip flop 102 and the mode 1 flip flop 12 are compared in gates 43 and 44 of FIG. 5A whose outputs go to 1 if only the mode 1 flip flop 12 is high (gate 43) and if only the mode 2 flip flop 102 is high (gate 44). These outputs are fed into a $S_D$, $C_D$ of flip flop 128 whose truth table shows that its output will be 1 if the mode 1 flip flop 12 is on longer (i.e. if A>S) and 0 if the mode 2 flip flop 102 is on longer (i.e., if S>A). The output of this flip flop 128 is used to give the sign to the bearing error.

Gates 129 and 130 decode 00- while 131 and 132 decode 18- and gates 133 through 137 decode the 0–9 to supply the third digit for 00 and 18. The three digits are combined in gates 47 through 51 so that the output of gate 47 is high if the count in the counters 18 is 000, 001, 180 or 181 and the output of gate 49 is high if the error is 004, 005, 184 or 185 etc., etc. Gates 138 and 139 decode 35- and gates 140 and 141 decode 17-. The last digit is decoded in gates 142 through 151. The three digits are combined together in gates 57 through 61 so that the output of gate 59 is high if the counter 18 equals 358, 357 or 178 or 177. Gates 47 and 57 are OR'ed in gate 62; gates 48 and 58 are OR'ed in gate 63 etc. The outputs of these OR gates are the representations of 0 to 1 degrees course, 2 or 3 degrees off course up to 8 or 9 degrees off course. Gate 152 detects when the bearing error is not 00-, 18-, 35- or 17-, i.e., when it is greater than 10°. OR gates 77–80 assure that if your are 4° or 5° off course the 2 or 3 bulb is lit and if you are 10 or more degrees off course all the bulbs on one side are turned on, etc. This gives a solid bar of light rather than just individual bulbs. Gates 67 through 76, of FIG. 5G are the steering gates and depending upon output of gate 46 of FIG. 5F they will cause either the left or right lights to be turned on. Gates 153, 154, 155 and 156 find if the error count is $\geq$ 180°. If so, gate 156 causes the A $\geq$ S-fly right, A $\geq$ S-fly left convention to be reversed through gates 157, 158 and 46. Gates 160, 159 and 161 decide whether the error is $\geq$ 90° while gates 162–167 decide if the error is $\geq$ 270°. These outputs are combined in gate 81 an exclusive OR to give the correct indication for the TO-FROM lights. All decoded outputs go through latches 22 of FIG. 5G which are strobed every 10–30 Hz cycles. The latches then drive cheap transistors 168 which turn on the bulbs 169.

As one can see the operation of mode one is a bit more complex than that of mode 2.

The Clock

As I have mentioned before this whole system is based on counting time. To do this you need a good time source, i.e., a stable clock. The clock is nothing more than an oscillator that gives you pulses at equal intervals. My clock runs at 10,800 Hz $\pm$, 10 Hz maximum which is about $\pm$ 0.1 percent, a hard number to achieve for a free running oscillator. I use a standard unijunction transistor oscillator 103 of FIG. 5A as my voltage controlled oscillator (VCO). The control voltage is the voltage across the R C path 200,201 connected to the base of the UJT 170 and the oscillator is set up in such a manner that when this voltage is $\approx$ 3.01 volts the device oscillates at 10,800 Hz. The output of the UJT is divided by 360 in four stages. First there is a ÷9, a decade counter 171 with a 1 count 172 wired into it. Next a ÷10 circuit - a straight decade counter 173. Then two ÷2 circuits done by two flip flops 174, 175. If the VCO 103 output is 10,800 Hz then the output of the +360 circuits will be a 30 Hz square wave. This 30 Hz square wave is then fed into a phase comparator 176–179 whose other input is the 30 Hz reference phase signal from the earlier part of the omni. The phase comparator 176–179 is really the inverted output of an exclusive OR function. This output is filtered by R180 and C181 and is then used to set the control voltage on the VCO 103. The result is a very accurate clock. It runs at 10,800 Hz ± 3 Hz and yet costs perhaps 10.00 dollars in parts or far less expensive than a crystal controlled oscillator.

A detailed description of the purpose and interrelation of components between the clock diagram of FIG. 6 and the schematic of FIG. 5 follows:

30 Hz Recovery Circuits (100): These circuits consist of some analog circuits whose output is the two 30 Hz sine waves that contain the information about the bearing of the aircraft. The Schmitt triggers 105, 106 turn the sine waves into square waves for the digital circuitry. The capacitors and resistors are to solve interfacing and biasing problems. The two inverters following each trigger 107–110 are used for buffering.

Mode 2 Master Flip Flop (102): The falling edge of the reference 30 Hz square wave triggers flip flop 102's output to a high state. The falling edge of the variable phase 30 Hz square wave generates a pulse through C2, R2 and the nor gate 111 that clears the output of flip flop 1 to zero. Thus the output of flip flop 102 is a direct representation of the phase difference to the two 30 Hz signals.

Phase Lock Clock (103): The basis of the clock is the voltage controlled oscillator (VCO) consisting of 170, 200, 201, R3, R4. Its output is amplified in 182 and through the two inverters 183, 184 and then divided by 360 through 171–175. Counter 171 dividing by 9 has a one count automatically set into it by gate 172 and the resistor and capacitor. The output of the divider 171–175 is phase compared with the 30 Hz reference square wave through gates 176-179. The output of the phase comparator is amplified and filtered through 179–181 so that the voltage at the top end of resistor 200 is exactly the voltage needed to make the oscillator run at 10,800 Hz. The Schmitt trigger 113 is used to speed up the rise and fall of the output pulses from the oscillator.

Mode 2 Master Counter (4): All counting in this device is averaged over 10–30 Hz cycles. This counter, 4 counts 10–30 Hz periods and after the tenth it puts out a pulse through gate 115 and the capacitor and resistor. This goes through two inverters 185, 186 into the mode 2 gating 5.

Mode 2 Gating (5): The mode 2 gating controls the mode 2 counters 7 and latches 8. Gate 112 allows the clock pulses from the Schmitt trigger 113 to flow into the mode 2 counters 7 whenever the output of mode 2 flip flop 102 is high. Gate 116 puts out a pulse when the master counter puts out its pulse, that strobes the latches 8 so that they take on the count in the mode 2 counters 7. After a slight delay through C6 gate 117 puts out a pulse which clears the counters 7 for the next 10–30 Hz counting period.

0°–360° Detector (6): Gates 123 and 124 put out pulses whenever the phase difference of the respective 30 Hz signals fall to zero. Thus gate 125 puts out a pulse whenever the pulses from gates 123 and 124 occur together, i.e., whenever the 2–30 Hz signals are in phase. Then through the mode two gating 5 it makes the digital display 10 read 000°.

Mode 2 Counters (7): These are simply four decade counters 7 that count the clock pulses coming from gate 112. The least significant digit is dropped, thereby achieving a simple form of averaging.

Latches (8): These are memories that take on the count in the counters at the end of each counting cycle. Thus the counters 7 can be cleared to zero for the next counting period without effecting the display 10.

Display Control Gating (9): This set of gates lets the three digit display be controlled by either the mode 2 counters 7 or the mode 1 OBS switches 11. For example, take gates 187–189 which control the input into $A_1$ of the decoder. If the mode select switch is turned to mode 2 it puts out a 1 which in turn disables gate 188 and enables gate 187. As a result gate 187 and 189 and thus the input to the decoder is controlled by the mode 2 latches 8 and counters 7. If the mode select switch is turned to mode 1 it puts out an 0 which disables gate 187 and enables gate 188 which turns over the control of the decoder inputs to the OBS switches 11.

Decoders and Digital Displays (10): The decoders are binary coded decimal to seven segment display type units that take the output of either the latches 8 or the OBS switches 11 and decodes it to drive the seven segment digital displays.

OBS switches (11): These are the omni bearing select switches that allow the pilot to set in the course he desires to fly during mode one operation. At present these switches consist of one ten position switch and a diode encoding matrix for each digit.

DIGITAL DUAL MODE VOR INDICATOR

Mode 1 Master Flip Flop (12): This flip flop controls the mode 1 counters 13. It is triggered by the same signal as the mode 2 flip flop 102 and through the mode 1 gating 15 allows the clock pulse to flow into the mode 1 counters 13. When the compare gating 14 clears the flip flop it stops the clock pulses to the counters 13.

Mode 1 Counters (13): These are again decade counters that count the clock pulses. These counters count to the number set by the OBS switches 11 and then stop. They are reset each 30 Hz period.

Compare Gating (14): These gates continuously compare the output of the mode 1 counters 13 with the OBS switches 11 and signals when the two are the same thus stopping the counting. Gates 27-36 each compare one digit and gates 26, 37–39 find when all the digits are identical which through the mode 1 flip flop 12 stops the counting and then clears the counters after a slight delay through gates 128 and C8. The two inverters 189, 190 before and the buffer 191 after gate 128 are to solve loading problems.

Mode 1 Gating (15): Gate 40 is controlled by the mode 1 flip flop 12 and allows the clock pulses to flow to the mode 1 counters 13. Gate 41 lets clock pulses flow into the error counters 18 through gate 42 whenever either the mode 1 or mode 2 counter 13, 7 is counting and the other one is not, i.e., it lets the difference of the two counts into the error counter.

Mode 1 Master Counter (16): This decade counter functions much like the mode 2 master counter 4. It counts 10–30 Hz cycles and then through gate 45, C9, R9 puts out a pulse which through C10 and R10 strobes the latches 22 and after a delay through gate 46 and the 5 capacitor, it clears the error counters.

Gating to Determine if A is Greater than S(17): Gate 43, 44 and flip flop 128 are used to determine if the actual bearing is greater than the set bearing, a bit of information needed to tell the pilot which direction to fly. If the output of the mode 2 master flip flop 102 is high longer than the output of the mode 1 flip flop 12, gate 43 keeps the output of flip flop 128 high. Otherwise gate 44 keeps it low. This information is then used in the steering gating 20.

Error Counters (18): These are four decade counters 18 that are controlled by gate 42 in the mode 1 gating 15. The number in these counters is equal to the phase difference the two 30 Hz signals in degrees. The error is added up for 10–30 Hz periods and then averaged by dropping the least significant digit.

Decoders (19): These gates take the count in the error counters and decode it to tell the pilot, via the lights, how far off course he is and which way to fly to get back to course. This decoding is complicated and follows the rules given in the disclosure. I will just discuss which gates decode which numbers. Gates 129–130 find 00-; gates 132–133 find 18-; gate 192 find 00- or 18-; gates 133–137 find 1–9 in 2 numeral increment; gates 138, 139 find 35-; gates 140,141 find 17-; gate 193 finds 35- or 17-; gates 142–151 and gates 52–56 find 1–9 in 2 numeral increments; gates 47–51 then find 001–009 and 181–189; gates 57–61 find 171–179, 181–189, 351–359, 0–9. The "or" gates 77–80 insure that the correct number of lights stay lit.

Sterring Gating (20): The gating allows the decoding circuits to turn on either the left or right set of lights. Gates 153–156 determine if the error is greater than 180° and gates 157–158, 46 combine this with information from flip flop 128 to give the left-right information. Gates 67, 69, 71, 73, 75 are enabled if one is to fly left and 68, 70, 72, 74, 76 are enabled if one is to fly right.

To-From Gating (21): This gating tells the pilot whether the course selected will take him to or from the station. Gates 159–161 determine if the error is greater than 90° while gates 162–167 determine if the error is greater than 270°. Gate 81 combines the information to give the correct steering information.

This unit is capable of operating in localizer mode also. The localizer information is carried in the relative strengths of a 90 Hz signal and a 150 Hz signal. First the signals have to be separated and this is done with active filtering techniques. I use the error counters and decoder logic to drive the left right display for localizer. Once the 90 and 150 Hz signals have been separated their relative levels are converted by a simple counter -ramp A/D conversion to a time function to allow for comparison and to control gating to run the error counters and decoders. The clock could be phase locked to the 90 Hz signal simply by dividing by a different number (1.8., 120 instead of 360). The localizer mode can be made to fit in with the scheme of mode 1 very easily. A 3 digit display spells out LOC when the unit is operating in localizer mode.

FIG. 8 illustrates the dials for conventional omni, my digital omni and the relationship to the localizer and glideslope.

FIG. 9 is a graph of the timing diagram and its relation by waveforms to the various points noted in the circuit diagram of FIG. 5.

Hence, it is seen that a digital two mode omni has been described in detail to meet the objects of the invention. However, it is to be understood that the invention is not limited thereto or thereby but that the inventive scope is defined in the appended claims.

What is claimed is:

1. A digital electronic VOR indicator device for aircraft comprising in combination:
   a. means for determining the phase difference between a reference signal and a variable phase signal, the phase of said variable phase signal being dependent upon the location of its origin with respect to the VOR indicator device;
   b. means for selecting a predetermined bearing;
   c. means for digitally displaying said bearing;
   d. means for determining the error difference between said phase difference and said bearing;
   e. means for digitally displaying the error difference;

the means (b), (c), (d), and (e) coacting with (a) and comprising a first mode;
   f. means for displaying the phase difference; the means (f) coacting with (a) and comprising a second mode; and
   g. means for selecting between said first and second modes.

2. A device in accordance with claim 1, wherein said means for determining the phase difference include
   a. means for producing substantially regular pulses at a frequency much higher than the frequency of said reference signal; and
   b. first means for electronically counting a multiplicity of said pulses between a point on said reference signal and a corresponding point on said variable phase signal whereby the distance between said points and said multiplicity of counts is a direct representation of the phase differences between the two signals over one cycle.

3. A device in accordance with claim 2, wherein said means for producing pulses include oscillator means which have a frequency of 360 times the frequency of said reference signal for producing a representation of said phase difference directly in degrees.

4. A device in accordance with claim 3, wherein said means for producing pulses include means for phase locking the output signal of said oscillator means to said reference signal.

5. A device in accordance with claim 1, which is additionally characterized by means for averaging said phase difference over a plurality of cycles of said reference signal and said variable phase signal.

6. A device in accordance with claim 2, which is additionally characterized by means for detecting the negative going zero crossing of said reference wave to begin said electronic counting and means for detecting the negative going zero crossing of said variable phase wave to end said counting.

7. A device in accordance with claim 3, which is additionally characterized by means for resolving the basic ambiguity in measuring the phase difference of waves in phase and two waves 360 degrees out of phase.

8. A device in accordance with claim 1, wherein said means for digitally displaying a predetermined bearing are the same means as said means for displaying the phase difference, and wherein the information displayed depends on said selecting means.

9. A device in accordance with claim 1, which is additionally characterized by including means for decoding the error difference into a to-from indication and means to display said to-from indication.

10. A device in accordance with claim 8 wherein said display means for digitally displaying the predetermined bearing forms a three-digit decimal display.

11. A device in accordance with claim 1, wherein said means for digitally displaying the error difference includes means for indicating the direction of travel required for movement toward said predetermined bearing.

12. A device in accordance with claim 11, wherein said means for indicating the direction of travel to correct said error difference is a substantially horizontal row of indicating lights and wherein the number of lights energized from the center of said row is a measure of said error difference and the side of the row on which said lights are lit is an indication of the direction of travel necessary to effect correction.

13. A device in accordance with claim 1, wherein said means for determining said error difference include
   a. second means for counting a multiplicity of said pulses corresponding to said predetermined bearing; and
   b. third means for counting a multiplicity of said pulses while either said second or first means is counting while the other is not, said count being a representation of said error difference.

14. A device in accordance with claim 13, which is additionally characterized by means which average said error difference over a plurality of cycles.

15. A device in accordance with claim 1, which is additionally characterized by means that coact with said means for determining the error difference for producing a localizer signal and means for displaying said localizer signal.

* * * * *